United States Patent [19]
Holmes et al.

[11] Patent Number: 5,964,006
[45] Date of Patent: Oct. 12, 1999

[54] ROTARY SURFACE TREATMENT TOOL

[75] Inventors: Dean S. Holmes, Saint Paul, Minn.; David C. Roeker, Hudson, Wis.

[73] Assignee: 3M Innovative Properties Company, St. Paul, Minn.

[21] Appl. No.: 08/782,782

[22] Filed: Jan. 13, 1997

[51] Int. Cl.⁶ .................................................. A46B 9/02
[52] U.S. Cl. ......................... 15/180; 15/230; 15/230.19; 403/344; 403/261
[58] Field of Search ................................ 15/230, 230.17, 15/180, 50.1, 49.1, 230.14, 87, 98, 230.16, 182, 230.19; 430/344, 261, 348; 451/508, 509, 521, 510, 353

[56] References Cited

U.S. PATENT DOCUMENTS

| | | | |
|---|---|---|---|
| Re. 26,552 | 3/1969 | Block et al. | 51/358 |
| 1,644,459 | 10/1927 | Abbedessa | 451/508 |
| 1,998,244 | 4/1935 | Lang | 15/230.19 |
| 2,021,608 | 11/1935 | Petty | 15/180 |
| 2,153,207 | 4/1939 | Petty | 15/180 |
| 2,541,526 | 2/1951 | Lundquist | 403/348 |
| 2,682,675 | 7/1954 | Prucha | 15/180 |
| 2,930,056 | 3/1960 | Lappin | 15/180 |
| 3,166,877 | 1/1965 | Reames | 51/378 |
| 3,181,195 | 5/1965 | Van Brakel | 15/180 |
| 3,270,467 | 9/1966 | Block et al. | 51/358 |
| 3,436,876 | 4/1969 | McAvoy et al. | 51/378 |
| 3,491,494 | 1/1970 | MacKay, Jr. | 51/358 |
| 3,518,709 | 7/1970 | Zemke et al. | 15/4 |
| 3,561,173 | 2/1971 | Block | 51/334 |
| 3,562,968 | 2/1971 | Johnson et al. | 51/389 |
| 3,667,170 | 6/1972 | MacKay, Jr. | 51/389 |
| 3,765,130 | 10/1973 | Block | 51/378 |
| 3,864,884 | 2/1975 | Weissman | 51/358 |
| 4,138,804 | 2/1979 | Thielen | 51/168 |
| 4,245,438 | 1/1981 | van Buren, Jr. | 51/377 |
| 4,439,953 | 4/1984 | Block et al. | 51/389 |
| 4,541,207 | 9/1985 | Antonson | 51/376 |

(List continued on next page.)

FOREIGN PATENT DOCUMENTS

| | | |
|---|---|---|
| 0 503 127 A1 | 9/1992 | European Pat. Off. . |
| 0 558 277 A1 | 9/1993 | European Pat. Off. . |
| 0 566 761 A1 | 10/1993 | European Pat. Off. . |
| 3613987 A1 | 10/1987 | Germany . |
| 4430229 A1 | 2/1996 | Germany . |
| 442225 | 1/1968 | Switzerland .............................. 15/180 |
| 708183 | 4/1954 | United Kingdom ..................... 15/180 |
| WO 96/33638 | 10/1996 | WIPO . |

OTHER PUBLICATIONS

Grindline Express, "Coated Abrasive, Surface Conditioning, and Superabrasive Products" brochure published by 3M Abrasive Systems Division 1996.

Literature from Dynorbital Random, "Orbital Disc Pads Stick–On Discs," pp. 38 and 52 of undated product brochure.

*Primary Examiner*—Gary K. Graham
*Attorney, Agent, or Firm*—James J. Trussell

[57] ABSTRACT

A rotary surface treatment tool is attached to a rotational driver with a kit. The surface treatment tool includes a base with a middle portion around a center hole, and one or more attachment knobs are placed on the front side of the middle portion. An attachment plate or retainer nut has a flange which extends radially over the middle portion of the base. The attachment knobs mate with holes in the flange of the retainer nut. The surface treatment tool is tightened onto the shaft by turning the surface treatment tool, with the attachment knob turning the retainer nut and thereby tightening the retainer nut to the threaded shaft. Assembly and tightening without any tools is thus facilitated. The base may be made of a flexible, shape-retaining material, and recesses are provided behind the attachment knobs to permit use with a retainer nut without a mating recess. The surface treatment tool may be a brush having bristles which extend at about 90° to the plane of the base. The bristles are disposed in a pattern of helical bristle curves, with each bristle curve providing a relatively continuous sweep.

17 Claims, 4 Drawing Sheets

U.S. PATENT DOCUMENTS

| | | | |
|---|---|---|---|
| 4,655,006 | 4/1987 | Block | 51/168 |
| 4,798,025 | 1/1989 | Lokken et al. | 51/168 |
| 4,839,998 | 6/1989 | Block | 51/376 |
| 4,888,843 | 12/1989 | Smith et al. | 15/98 |
| 4,901,479 | 2/1990 | Helm | 51/170 |
| 4,932,163 | 6/1990 | Chilton et al. | 51/170 |
| 4,976,071 | 12/1990 | Stäbler | 51/168 |
| 5,050,262 | 9/1991 | Malish | 15/180 |
| 5,201,149 | 4/1993 | Eisenbältter | 51/394 |
| 5,201,785 | 4/1993 | Nagano | 51/358 |
| 5,263,283 | 11/1993 | Rudolf et al. | 51/170 |
| 5,339,571 | 8/1994 | Timmons et al. | 51/168 |
| 5,386,608 | 2/1995 | Montabaur et al. | 15/179 |
| 5,438,728 | 8/1995 | Kubes et al. | 15/180 |
| 5,545,078 | 8/1996 | Schulz et al. | 451/342 |
| 5,558,571 | 9/1996 | Toyoshima et al. | 451/358 |
| 5,778,481 | 7/1998 | Amsden et al. | 15/102 |

ROTARY SURFACE TREATMENT TOOL

BACKGROUND OF THE INVENTION

The present invention relates to surface treatment tools, and, more particularly, to attachment of a surface treatment tool such as a rotary brush to a rotational driver by using a kit. The present invention also relates to a bristle configuration for that rotary brush.

Numerous applications of rotary surface treatment tools are known. The tools often include a disk, plate or base portion which provides structural integrity for a surface treatment member. A surface treatment member extends from a face of the base. The surface treatment member can be, for instance, bristles of a brush, an abrasive such as sandpaper or grind stone, or a polishing buffer. A backing plate, face plate or other support structure may also be provided to provide support for the surface treatment member in use.

The surface treatment tool is used by attaching the tool to a rotational driver, such as a drill. For instance, a drill may have a threaded shaft which is rotated by the drill motor, and the surface treatment tool is attached by the threaded shaft. Alternatively, the drill may accept and rotate a bit, and the bit may be threaded. During use of the surface treatment tool, the surface treatment member is apt to wear or deteriorate, requiring occasional replacement with a new surface treatment member. Additionally, several different types of surface treatments may be performed with the same drill, requiring switching between different types of surface treatment members. For instance, sanding is often performed by sequential use of different sandpapers, starting with a coarse grained sandpaper and progressing through finer grained sandpapers. The drill may alternatively be used to perform completely different operations, on the same or different surfaces.

To reduce the cost of replacement or switching of surface treatment members, it is preferred that the rotary surface treatment tool be provided as a kit, with as much of the non-wearing support structure portion being reusable as possible. The used surface treatment member is replaced and the new surface treatment member is assembled with the rest of the kit and reattached to the rotational driver.

A wide variety of structures have been used to mount a surface treatment member to a support structure and/or shaft. For instance, the helically grooved drive button of U.S. Pat. No. 3,562,968 may be used. Other means of attachment, such as hook and loop fabric type fasteners of the type disclosed in U.S. Pat. Nos. 2,717,437, 3,009,235 or 5,077,870 or of the type commercially available under the trademark SCOTCHMATE from Minnesota Mining and Manufacturing Company, St. Paul, Minn., may be used alternatively or in conjunction with other attachment members in the kit. Many other more complicated structures have also been devised.

Some rotary surface treatment tool kits can provide attachment from the front, face or treatment side of the planar base. A tightening member extends through a hole in the surface treatment tool and places a compression force on the front (non-driven) side of the planar base. This compression force holds the surface treatment tool against a backing plate or hub. The tightening member may be made of metal and may have internal threads which mate with external threads on the shaft or bit. For instance, U.S. Pat. No. 3,166,877 shows such a kit.

Some of these prior attachment means include a point of relatively high shear stress for the attachment structure provided, leading to inelastic cycling and breakage problems of the attachment structure. Often the point of high shear stress in these attachment structures also carries a tension force which exacerbates the breakage problems. Attachment means such as hook and loop fabric type fasteners or adhesives can separate and not provide a reliable attachment force. Others of these attachment structures are structurally complicated and overly expensive to manufacture. Many of these attachment structures cannot be attached or tightened by hand and require tools such as wrenches which add expense to the kit and can be lost by the operator or user.

When a brush is used as the surface treatment member, the individual bristles may leave undesirable individual grooves or marks on the worked surface, referred to as "scribing". These grooves or marks occur particularly at stoppage of the drill or at removal of the brush from the worked surface. They may also occur at the starting of the drill, at contact of the brush to the worked surface, or when the brush is applied at an angle to the worked surface.

SUMMARY OF THE INVENTION

The present invention is a surface treatment tool for use with a kit in attaching to a rotational driver. The surface treatment tool includes a generally planar base with a center hole disposed therein. On a middle portion on the base, one or more attachment knobs are placed. The surface treatment member extends from a peripheral portion of the base. An attachment plate or retainer nut has a flange which extends radially over the middle portion of the base. The retainer nut has internal threads which mate with the external threads of a rotationally driven shaft. The preferred attachment plate has at least one recess which mates with the attachment knob. The surface treatment tool is tightened onto the shaft by turning the surface treatment tool, with the attachment knob turning the attachment plate and thereby tightening the retainer nut to the threaded shaft. Assembly and tightening without any tools is thus facilitated.

The preferred base is made of a flexible material, and recesses are provided behind the attachment knobs to permit use with a retainer nut without a mating recess. In the preferred embodiment, the surface treatment tool is a brush having bristles which extend at about 90° to the plane of the base. The bristles are disposed in a pattern of helical bristle curves, with each bristle curve providing a relatively continuous sweep.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
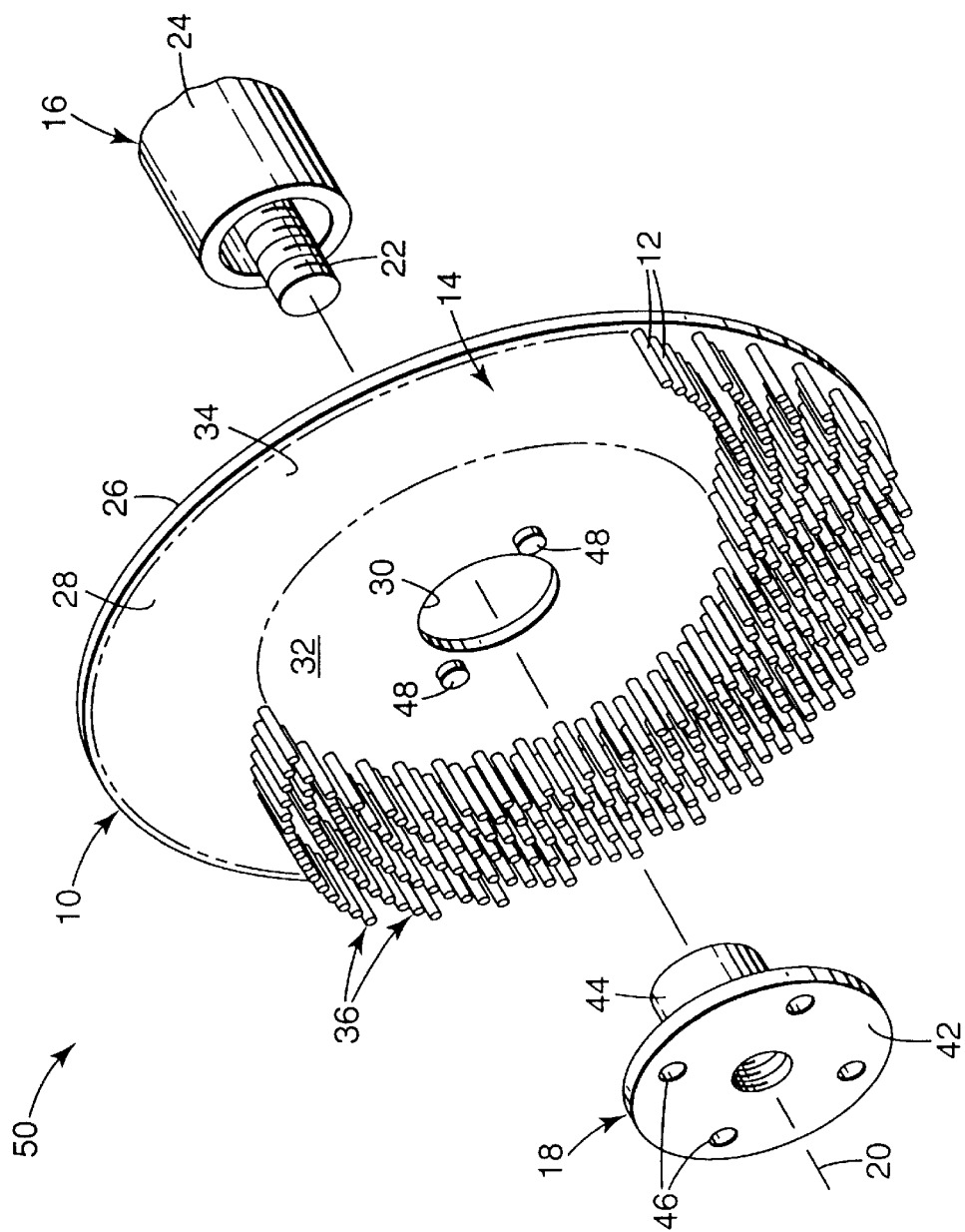
FIG. 1 is an exploded perspective view showing the rotary surface treatment tool of the present invention.
Figure 2:
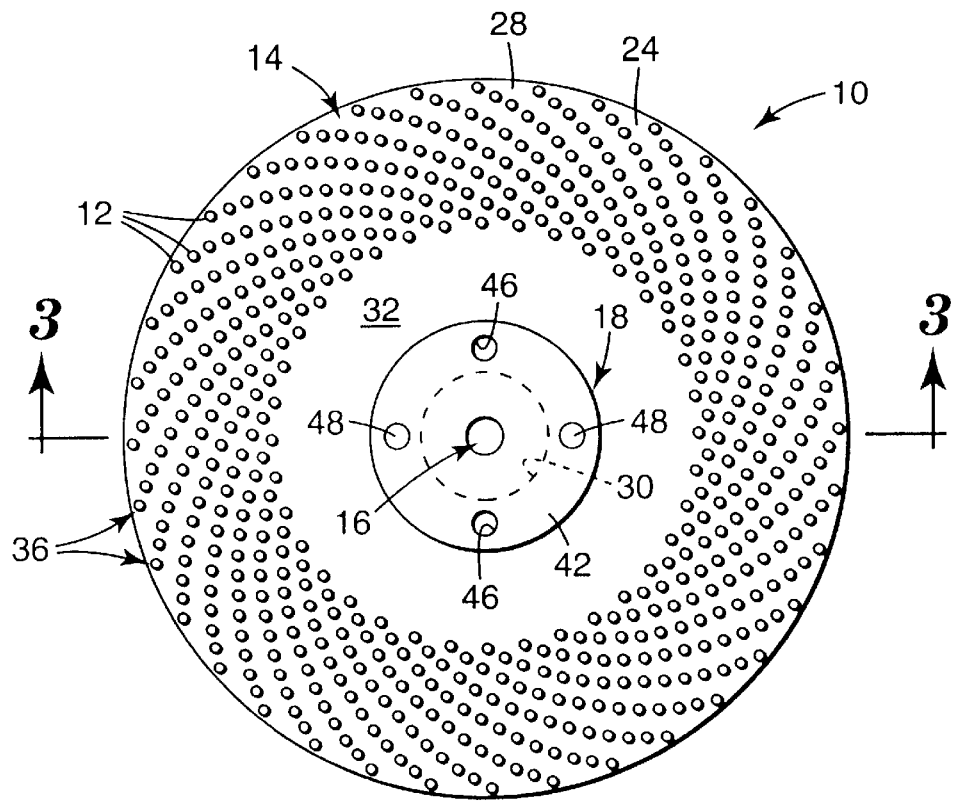
FIG. 2 is a front view of the rotary surface treatment tool of the present invention.
Figure 3:
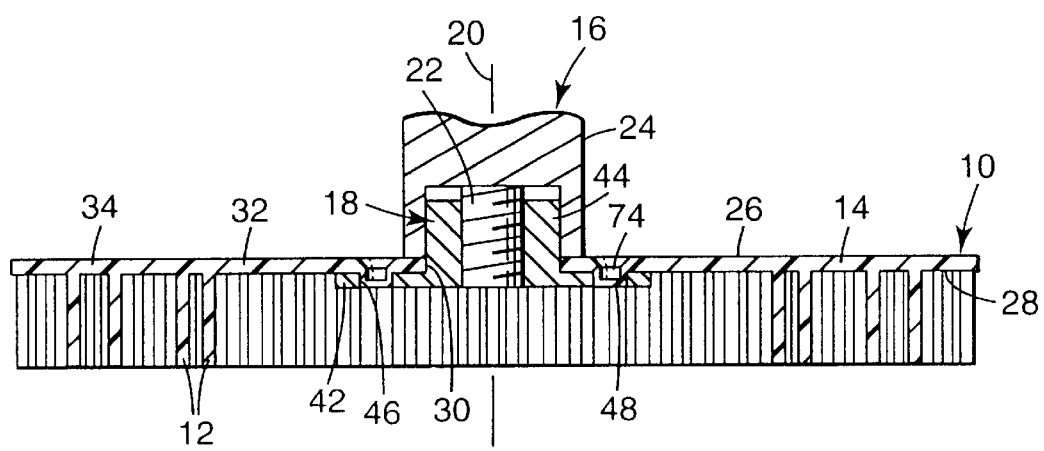
FIG. 3 is a cross-sectional view of the rotary surface treatment tool of FIG. 2 taken along line 3—3.

FIGS. 1–3 show a rotary surface treatment tool according to the present invention. The rotary surface treatment tool is a brush 10 having bristles 12 extending from a face plate or base 14. The brush 10 is attached to a shaft 16 with an attachment plate or retainer nut 18. The shaft 16 is rotationally driven, and during use the brush 10 rotates about an axis of rotation 20. The shaft 16 includes external threads 22 and a flange 24. The brush 10 has a drive side 26 facing toward the shaft 16, and a front side 28 facing away from the shaft 16.

The base 14 defines a center opening or hole 30. A generally planar middle portion 32 extends outward from the hole 30, and a peripheral portion 34 of the base 14 extends outward from the middle portion 32. The brush bristles 12 are located on the peripheral portion 34.

The preferred brush 10 shown in FIGS. 1–3 and 5–7 has a 4.5 inch outer diameter with a 0.875 inch diameter center hole 30. The bristles 12 are about 0.75 inches long. Preferably the bristles 12 have about a 1.5° taper from base to about 0.05 inches from the tip, with the remainder of the tip being cylindrical. The bristles 12 extend at about a 90° angle to the plane defined by the middle portion 32 of the base 14, or generally parallel to the axis of rotation 20. Alternatively, the bristles 12 may extend inwardly at a slight angle such that the centrifugal force of rotation causes the bristles 12 to extend generally parallel to the axis of rotation 20 and normal to the base 14 during use. As another alternative, the bristles 12 may extend parallel to the middle portion 32 of the base 14, or at any angle between 0 and 90°.

The brush 10 is preferably molded in a one-piece construction of a flexible polymeric material. Further description of the preferred brushes, including methods of manufacture and descriptions of the base, the bristles, and the preferred polymeric material including any desired additives such as abrasive particles, lubricants, coupling agents, fillers, and grinding aids, is provided in U.S. patent application Ser. Nos. 08/555,934, 08/558,718 and 08/431,910, all of which are incorporated by reference. Workers skilled in the art will appreciate that the design details of the brush and the bristles may be altered as necessary for the material used and the particular application for which the brush is design.

In the preferred embodiment, the bristles 12 are configured into a plurality of helical arcs or bristle curves 36. Each bristle 12 in the bristle curve 36 is equally spaced from adjacent bristles 12 in the bristle curve 36. As best depicted in FIG. 2, fifteen bristles 12 may be included in each bristle curve 36, and thirty-six bristle curves 36 may be uniformly spaced around the peripheral portion 34 of the base 14.

Figure 4:
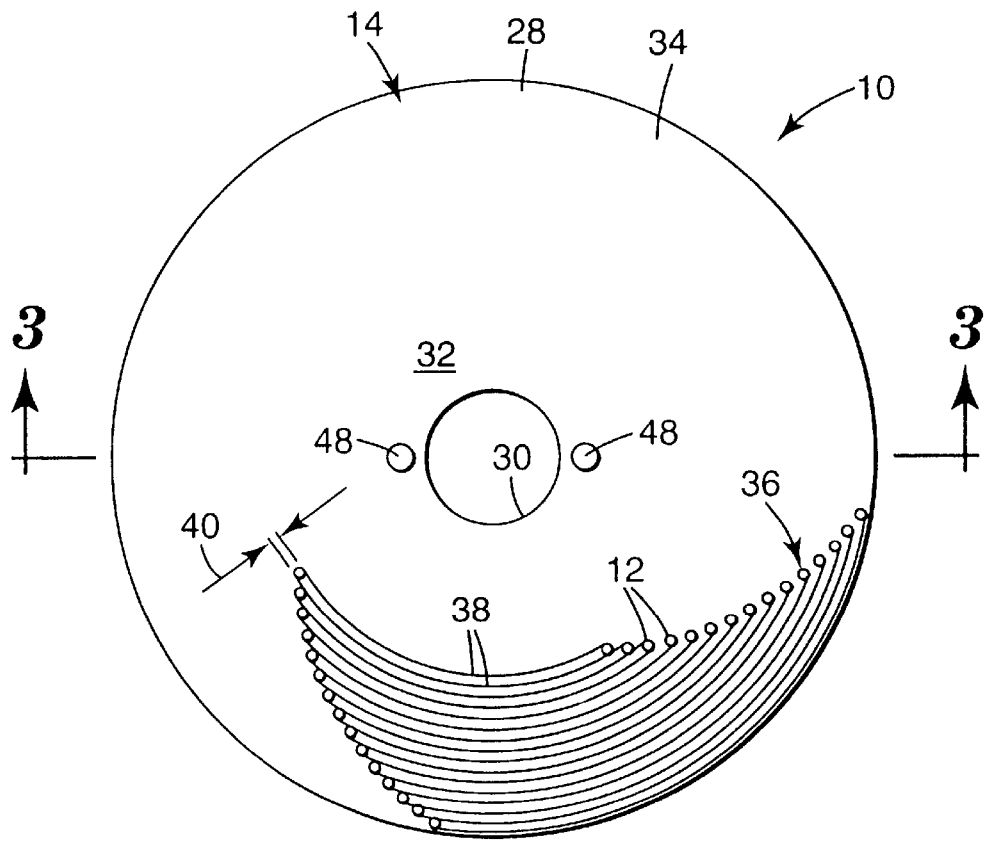
FIG. 4 is a depiction of the area of coverage of a single bristle curve of the brush of FIGS. 1–3 during a 90° rotation of the brush.

The bristles 12 in each bristle curve 36 are spaced radially to provide a generally continuous and uniform sweep by the bristle curve 36. This is best shown with reference to FIG. 4, which depicts a sweep 38 of area contacted by each bristle 12 in a single bristle curve 36. For instance, the bristles 12 of the preferred brush 10 have a circular cross-section with a tip diameter of about 0.05 inches. The bristles 12 in the bristle curve 36 are approximately located at radii which are whole multiples of 0.05 inches. During use of the brush 10, each bristle 12 has a width of contact 40 with the surface being worked between an inner edge and an outer edge of the bristle 12. With the 0.05 inch tip thickness, the width of contact 40 for each individual bristle 12 is about 0.05 inches. Because the bristles 12 are spaced radially at 0.05 inches away from each other, the inner edge of each bristle 12 is substantially equidistant from the axis of rotation 20 of the brush 10 as the outer edge of the preceding bristle 12. The combination of the bristles 12 thus spaced in the bristle curve 36 produces a substantially continuous and uniform sweep 38 of area contacted by the bristle curve 36 during rotation of the brush 10. This sweep 38 of area contacted, made by fifteen 0.05 inch thick bristles 12, is about 0.75 inches wide. By using this bristle configuration, scribing (markings on the worked product associated with starting and stopping of the tool) is significantly reduced. Having the bristles 12 in this configuration also produces a pleasing visual effect.

Workers skilled in the art will appreciate that any cross-sectional shape of bristle may be provided in the described bristle curve configuration to produce the beneficial results of the present invention. For instance, square, oval or rectangular bristles could be provided, with the inner edge of each bristle being substantially equidistant from the axis of rotation 20 of the brush 10 as the outer edge of the preceding bristle in the bristle curve 36.

It will be noted that the number of bristles in each bristle curve is determined by the width of the individual bristles and the amount of coverage sought. For instance, the peripheral portion 34 of bristles 12 shown in the preferred embodiment, provided by bristle curves 36 with fifteen 0.05 inch wide bristles 12, is about 0.75 wide. The same width peripheral portion 34 of bristles could also be provided by bristle curves of seventy-five 0.01 inch wide bristles.

The brush 10 is attached to the shaft 16 by the retainer nut 18. The preferred retainer nut 18 has a radially extending flange 42 and an axially extending portion 44. The axially extending portion 44 has internal threads which mate with external threads 22 on the shaft 16. The axially extending portion 44 has an outer diameter which is slightly smaller than the diameter of the center hole 30 on the brush 10. Attachment of the brush 10 onto the shaft 16 is achieved by placing the axially extending portion 44 of the retainer nut 18 through the center hole 30, and then by by screwing the retainer nut 18 onto the threads 22 of the shaft 16. The middle portion 32 of the base 14 is compressed between the flange 42 of the retainer nut 18 and the flange 24 of the shaft 16, and the brush 10 is held securely in place.

The retainer nut 18 preferably has four holes 46 disposed in the flange 42. The holes 46 are about 0.25 inches in diameter and allow tightening of the retainer nut 18 with the use of a conventional face pin spanner wrench (not shown). Such a retainer nut 18 is available from Minnesota Mining and Manufacturing Company, St. Paul, Minn. The spanner wrench has two pins of about ¼ inch length which extend generally perpendicular to the handle of the spanner wrench. Insertion of the pins into the holes 46 couples the spanner wrench to the retainer nut 18 and allows tightening of the retainer nut 18 with the spanner wrench.

Two attachment knobs 48 are provided on the front side 28 of the brush 10 on the middle portion 32 adjacent the center hole 30. The preferred attachment knobs 48 are cylindrical having a height of 0.125 inches and diameter of 0.219 inches. The attachment knobs 48 are located 1.25 inches apart on opposite sides of the center hole 30. The attachment knobs 48 mate with two of the four holes 46 of the retainer nut 18. Workers skilled in the art will appreciate that the size, shape and location of the attachment knobs 48 may vary depending upon the geometry of the retainer nut used to lock the surface treatment tool onto the shaft 16. Workers skilled in the art will also appreciate that attachment knobs 48 may be use with a wide variety of attachment plate configurations other than retainer nut 18.

The primary advantage of the attachment knobs 48 is that the brush 10 will interlock with the retainer nut 18 so that rotation of the brush 10 by the user will cause the retainer nut 18 to tighten onto the threaded shaft 16. The attachment knobs 48 allow the retainer nut 18 to be tightened onto the shaft 16 without any grasping of the retainer nut 18 or use of tools such as a pin face spanner wrench. Attachment without tools is especially convenient for brushes such as the preferred brush 10 shown, wherein the bristles 12 might interfere with the use of wrenches.

To attach the brush 10 to the shaft 16 without any tools, the retainer nut 18 is placed on the brush 10 so that the attachment knobs 48 extend into two of the four holes 46 of the retainer nut 18. The brush 10 is then grasped and turned by the user while keeping the shaft 16 stationary. The attachment knobs 48 rotate the retainer nut 18 with the brush 10, tightening the retainer nut 18 onto the threads 22 of the shaft 16. When the user has completed use of the brush 10, the brush/retainer nut assembly can be removed from the shaft 16 by grasping the brush 10 and turning the brush/retainer nut assembly while keeping the shaft 16 stationary.

In some instances it may be desired to use a spanner wrench to tighten on the brush 10 having the attachment knobs 48. This may still be accomplished because two of the four holes 46 of the retainer nut 18 do not house attachment knobs 48 and remain free to receive the pins of the spanner wrench.

The attachment knobs 48 are also useful in providing a mechanically interlocking drive mechanism between the retainer nut 18 and the brush 10. The mechanically interlocking drive mechanism is in addition to the frictional and compression drive mechanisms of standard surface treatment tools. The interlocking nature of attachment knobs 48 and holes 46 in retainer nut 18 assures that there will be no slippage of brush 10 with respect to retainer nut 18.

In the preferred embodiment, the retainer nut 18 is provided to the user together with the brush 10 in a kit 50. The kit 50 allows use of multiple different surface treatment tools with a single retainer nut 18. The kit 50 also allows replacement of a worn brush 10 without requiring replacement of the retainer nut 18. The kit 50 may also provide a collection of retainer nuts for different sized shafts on different tools. For instance, the retainer nuts 18, 52 shown in FIGS. 1–3 and 5–7 are sized for a ⅝-11 shaft (⅝ inch diameter with 11 threads per inch). Retainer nuts sized for other conventional shaft sizes, such as ⁷⁄₁₆-20, ½-13, M10-1.25, M10-1.5, M14-2.0, M16-2 or other shaft sizes, may also be provided as part of the kit 50. Alternatively, different kits may be sold, with each kit having only one retainer nut particularly designed to fit on one size of shaft. Depending on the type of rotational driver that the kit 50 is designed for, the kit 50 may include the threaded bit or shaft 16, and the shaft 16 may subsequent be attached to and rotated by the rotational driver during use.

Figure 5:
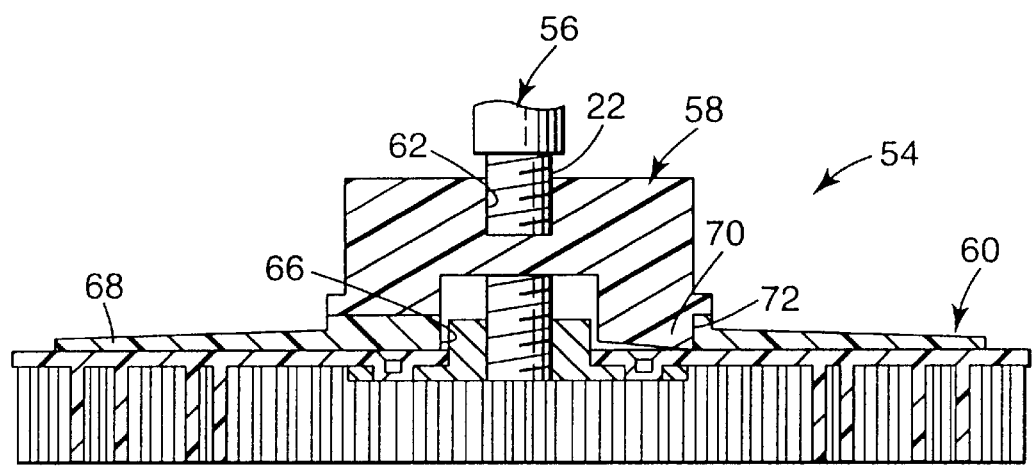
FIG. 5 is a cross-sectional view showing use of the brush of FIGS. 1–3 with an alternative attachment kit.
Figure 6:
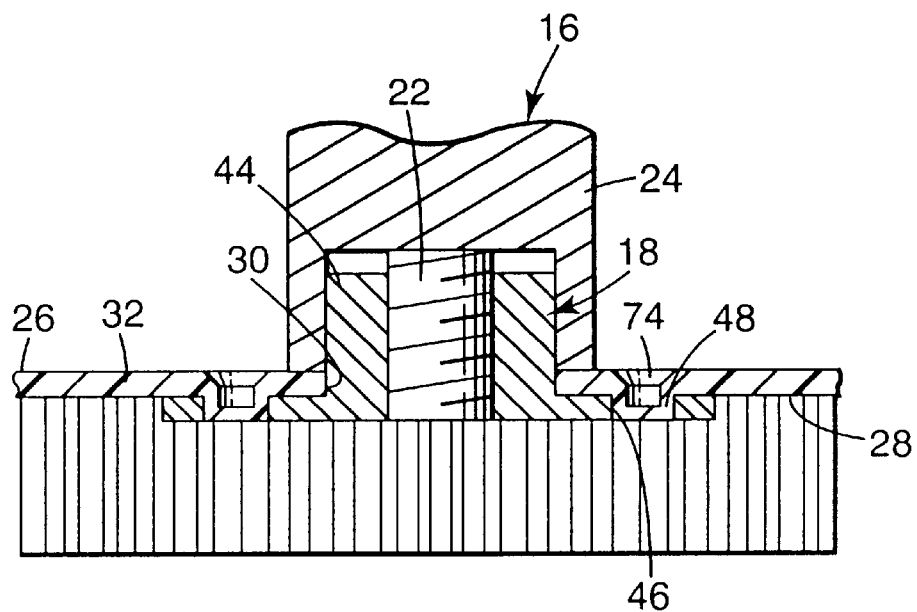
FIG. 6 is an enlarged partial cross-sectional view of FIG. 3 showing the attachment knob.

FIG. 5 shows the use of the present invention in a different kit 54, which is intended for use with a threaded shaft 56 without a flange. For instance, this kit 54 may be used with a shaft 56 of a Bosch 4.5 inch right angle disc grinder Model 1347A. The kit 54 includes a short shaft disc pad hub 58 and a disk pad face plate 60, both of which are available from Minnesota Mining and Manufacturing Company, St. Paul, Minn. The short shaft disc pad hub 58 has a center opening 62 with internal threads which mate with the external threads 22 of the shaft 56. The short shaft disc pad hub 58 also has a shaft extension portion 64 with external threads of the same size has the internal threads of the center opening 62. The shaft extension portion 64 of the short shaft disc pad hub 58 acts as an extension of the shaft 56 in attaching the brush 10 thereto. The short shaft disc pad hub 58 is threaded onto the shaft 56, and the disc pad face plate 60 is placed onto the hub 58. The disc pad face plate 60 is annular and has a center opening 66 larger than the threads 22 of the shaft 56. The disc pad face plate 60 has a radially extending flange portion 68 for biasing and supporting the drive side 26 of the peripheral portion 34 of the brush 10. The short shaft disc pad hub 58 includes an extension 70 which mates with a recess 72 in the face plate 60 to couple the face plate 60 to the hub 58. The disc pad face plate 60 is coupled onto the hub 58, and the combination hub/face plate is threaded onto the shaft 56. The brush 10 and retainer nut 18 are then attached to the shaft extension portion 64 to attach the brush 10 to the tool as previously described.

In the preferred embodiment, the attachment knobs 48 are hollow and form a recess 74 on the drive side 26 of the middle portion 32 opposite the attachment knobs 48. The middle portion 32 of the brush 10 is formed of a flexible material. In the preferred embodiment, the attachment knobs 48 are formed with about a 0.060 wall thickness, and a recess 74 which is part conical and part cylindrical is provided.

Figure 7:
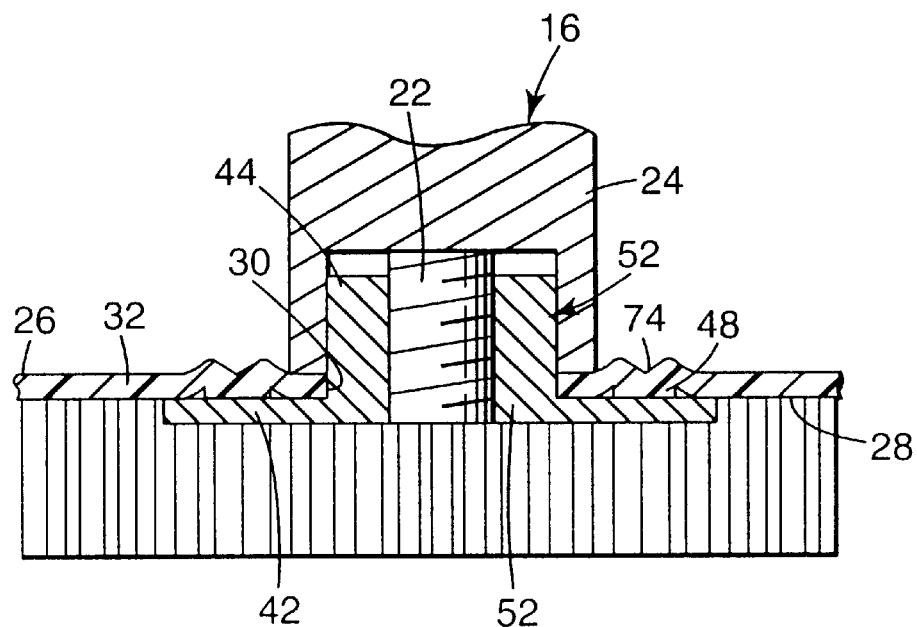
FIG. 7 is an enlarged partial cross-sectional view showing use of the brush of FIGS. 1–3 with a second alternative attachment kit.

The hollow recesses 74 on the back side of the attachment knobs 48 allow for crushing of the attachment knobs 48 when an alternative retainer nut 52 without spanner wrench holes is used to tighten the finishing tool onto the shaft 16. FIG. 7 shows such an alternative retainer nut 52. The alternative retainer nut 52 does not have spanner wrench holes, but compresses the attachment knobs 48 into the recesses 74 when the alternative retainer nut 52 is tightened. If desired, the middle portion 32 of the brush 10 may be formed of a shape-retaining material, such that the knobs 48 spring back to their original shape when the compression force of the alternative retainer nut 52 is removed.

Although the present invention has been described with reference to preferred embodiments, workers skilled in the art will recognize that changes may be made in form and detail without departing from the spirit and scope of the invention. For instance, workers skilled in the art will appreciate that the attachment knobs 48 of the present invention can be used with completely different types of surface finishing tools, such as a polishing buffer, or an abrasive surface such as sandpaper or grindstone, or the like.

What is claimed is:

1. A rotary surface treatment kit comprising:
    a surface treatment tool for use with a rotationally driven shaft having threads, the surface treatment tool comprising:
        a base having a drive side and a front side opposite the drive side, the base having a center opening larger than the threads of the shaft and defining an axis of rotation, the base having an annular middle portion around the center opening which is generally planar, the base having a peripheral portion outward from the middle portion;
        a surface treatment member extending from the peripheral portion of the base; and at least one attachment knob projecting from the front side of the middle portion of the base; and an attachment plate having threads which mate with the threads of the shaft, the attachment plate comprising a flange for biasing against the front side of the middle portion of the surface treatment tool, the flange having at least one recess defined therein for mating with the attachment knob such that the attachment plate can be tightened onto the shaft by mating the attachment knob in the recess and turning of the surface treatment tool relative to the shaft.

2. The rotary surface treatment kit of claim 1, further comprising:

an annular face plate having a center opening larger than the threads of the shaft, the face plate having a radially extending flange portion for biasing and supporting the drive side of the peripheral portion of the surface treatment tool.

3. The rotary surface treatment kit of claim 2, further comprising a hub having threads which mate with the threads of the shaft, wherein the hub includes an extension and wherein the face plate includes a recess which mates with the extension of the hub to couple the face plate to the hub.

4. The rotary surface treatment kit of claim 1, wherein the threads on the shaft are external threads, and wherein the attachment plate is a retainer nut having an axially extending portion with internal threads, the axially extending portion of the retainer nut being receivable within the center opening of the surface treatment tool.

5. The rotary surface treatment kit of claim 1, wherein the attachment knob is a right cylindrically shaped projection.

6. The rotary surface treatment kit of claim 5, wherein the recess is a cylindrical hole through the flange of the attachment plate.

7. The rotary surface treatment kit of claim 1, wherein the surface treatment tool is formed as a single molded article.

8. The rotary surface treatment kit of claim 1, wherein the surface treatment member is a brush having bristles extending from the front side of the peripheral portion of the base.

9. The rotary surface treatment kit of claim 8, wherein the bristles are arranged into a plurality of bristle curves equally spaced around the peripheral portion of the base, each bristle curve having a plurality of bristles uniformly spaced on a helical curve, each bristle having a thickness between an inner edge and an outer edge, wherein the inner edge of each bristle is substantially equidistant from an axis of rotation of the brush as the outer edge of the preceding bristle, such that each of the bristle curves forms a substantially continuous sweep of area contacted by the bristle curve during rotation of the brush.

10. The rotary surface treatment kit of claim 1, further comprising the shaft having threads provided as part of the rotary surface treatment kit.

11. A rotary surface treatment tool for use in a rotary surface treatment kit, the rotary surface treatment tool comprising:

a base having a drive side for attachment to a rotational driver and a front side opposite the drive side, the base defining an axis of rotation, the base having a center opening, an annular middle portion around the center opening which is generally planar, and an annular peripheral portion outward from the middle portion;

an annular surface treatment member extending from the front side of the peripheral portion of the base; and at least one attachment knob projecting from the front side of the middle portion of the base;

wherein the surface treatment tool further comprises a recess on the drive side of the base at the attachment knob and is formed of a flexible material such that the attachment knob is compressible under pressure into the recess.

12. The rotary surface treatment tool of claim 11, wherein the surface treatment tool is formed of a shape-retaining material such that the attachment knob returns out of the recess and to its original configuration upon decompression.

13. The rotary surface treatment tool of claim 11, formed as a single molded article.

14. A rotary brush comprising:

a generally planar base having a drive side for attachment to a rotational driver and a bristle side, the base defining an axis of rotation;

a plurality of bristles extending from the bristle side, the plurality of bristles arranged into a plurality of bristle curves, each bristle curve having a plurality of bristles uniformly spaced on a helical curve, each bristle having a thickness between an inner edge and an outer edge, wherein the inner edge of each bristle is substantially equidistant from the axis of rotation of the brush as the outer edge of the preceding bristle, such that each of the bristle curves forms a substantially continuous sweep of area contacted by the bristle curve during rotation of the brush; and attachment means disposed on the bristle side of the base for attaching the brush to a rotational driver.

15. A rotary brush comprising:

a generally planar base having a drive side for attachment to a rotational driver and a bristle side, the base defining an axis of rotation; and a plurality of bristles extending from the bristle side, the plurality of bristles arranged into a plurality of bristle curves, each bristle curve having a plurality of bristles uniformly spaced on a helical curve, each bristle having a thickness between an inner edge and an outer edge, wherein the inner edge of each bristle is substantially equidistant from the axis of rotation of the brush as the outer edge of the preceding bristle, such that each of the bristle curves forms a substantially continuous sweep of area contacted by the bristle curve during rotation of the brush;

wherein the base has a center opening, and further comprising at least one attachment knob projecting from the bristle side of the base adjacent the center opening.

16. The rotary brush of claim 15, further comprising a recess on the drive side of the base opposite the attachment knob, wherein the attachment knob is flexible so as to deflect under pressure into the recess.

17. The rotary brush of claim 16, formed as a single molded article.

* * * * *